Figure 1:
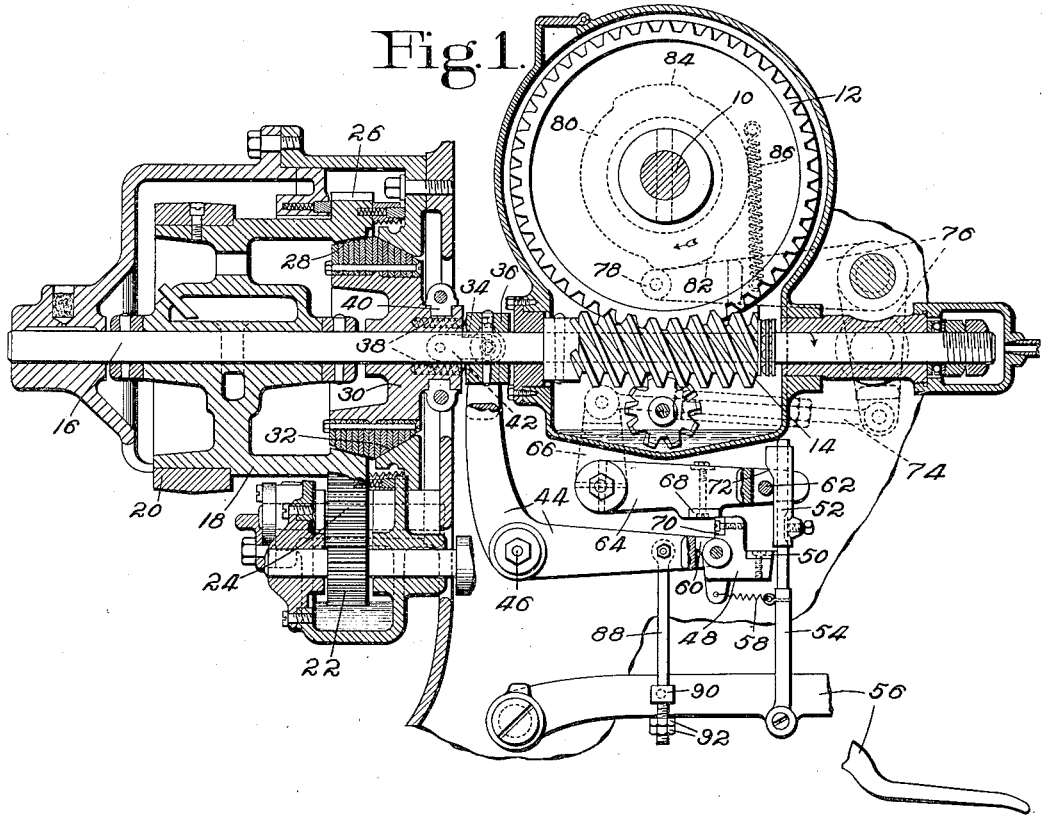

Aug. 27, 1935.        A. F. PYM ET AL        2,012,350

STARTING AND STOPPING MECHANISM

Original Filed May 20, 1930

INVENTORS
Arthur F. Pym
William E. Scarlett
By their attorney
Harlow, Davis

Patented Aug. 27, 1935

2,012,350

UNITED STATES PATENT OFFICE 2,012,350

STARTING AND STOPPING MECHANISM

Arthur F. Pym, Swampscott, and William E. Scarlett, East Lynn, Mass., assignors to United Shoe Machinery Corporation, Paterson, N. J., a corporation of New Jersey Original application May 20, 1930, Serial No. 454,095. Divided and this application September 4, 1931, Serial No. 561,198

10 Claims. (Cl. 192—144)

This invention relates to starting and stopping mechanism, the present application being a division of a copending application for United States Letters Patent No. 1,864,669, granted June 28, 1932 for improvements in Machines for operating on shoes.

In the control of some kinds of power-operated machines, of which the machine shown in the above-mentioned Letters Patent is an example, it is desirable that the operator be enabled to bring the machine to a stop at will. The present invention provides improved starting and stopping mechanism having simple and conveniently operable means for accomplishing this result. The herein disclosed embodiment of the invention comprises means whereby a controlling or starting member, which is movable by the operator to start the operation of a power-driven member, is operative by further movement in the same direction as its starting movement to stop the operation of the power-driven member. In the construction shown the starting member controls a clutch which is tripped to start the operation of the power-driven member and is further controlled automatically to stop the operation at a definite time; and in another aspect the invention provides, in such an organization, means to render the starting member effective by additional movement to stop the operation at the will of the operator, or independently of the automatic control.

The novel features of the invention will now be more particularly described by reference to the accompanying drawing and pointed out in the claims.

Figure 2:
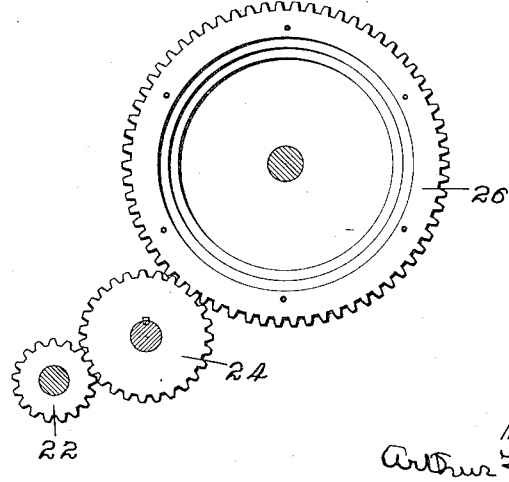

In the drawing,

Fig. 1 is a view, partly in elevation and partly in section, of a portion of the machine shown in the above mentioned Letters Patent, including mechanism in which the present invention is embodied; and Fig. 2 is a view showing in elevation a train of gears included in the structure shown in Fig. 1.

In the construction shown there is a power-driven member or shaft 10 through which parts of the machine are operated in a predetermined cycle by each revolution of the shaft. Fast on the shaft 10 is a worm gear 12 driven by a worm 14 which is fast on a shaft 16. Mounted loosely on the shaft 16 is a drum 18 which may be driven either by a belt operating on a pulley 20 fast on the drum, or by an electric motor (not shown) connected to the drum through a train of gears 22, 24 and 26, the gear 26 being formed on the drum itself. At one end the drum 18 is so formed as to provide an internal friction clutch face 28 arranged to cooperate with a clutch member 30 slidingly mounted on the shaft 16 to move lengthwise of the shaft, this clutch member being also arranged to engage a stationary brake surface 32 when it is not in engagement with the clutch face 28. The clutch member 30 is connected to the shaft 16 to turn therewith by means of a tongue 34, shown by dotted lines, which projects into a slot formed in a collar 36 pinned to the shaft. Springs 38 mounted in the hub of the clutch member 30 and pressing on the collar 36 tend to move the clutch member into engagement with the clutch face 28.

For controlling the clutch member 30 there are mounted in an annular groove in the hub of the clutch member two halves of a split collar 40 connected by links 42 to a forked arm of a bell-crank lever 44 pivoted at 46 on the frame of the machine. On the end of the other arm of the bell-crank lever there is pivotally mounted a block 48 having thereon a plate 50 arranged to be engaged by the lower end of a sleeve 52 fast on a rod 54 which is pivoted at its lower end to a treadle 56 normally raised by a spring (not shown). A spring 58 connected both to the block 48 and to the rod 54 tends to hold these parts in the positions illustrated in the drawing with the lower end of the sleeve 52 over a portion of the upper face of the plate 50. This position of the block 48 is determined by a lug 60 on the block in engagement with a portion of the lever 44. The position of the rod 54 is determined by a pin 62 against which the sleeve 52 is held by the spring 58, this pin being mounted in the forked end of an arm 64 fast on a rock shaft which also carries an arm 66 automatically controlled as hereinafter described. The arm 64 carries a plate 68 which, with the parts in the positions illustrated, engages a plate 70 on the block 48 and thus maintains the bell-crank lever 44 in position to disengage the clutch member 30 from the clutch face 28 and to hold it against the brake surface 32. When the operator depresses the starting treadle 56, the sleeve member 52 acts on the plate 50 to tip the block 48 in such manner as to carry its plate 70 out from under the plate 68, thus tripping the clutch so that the springs 38 force the clutch member 30 into engagement with the clutch face 28 to start the operation of the machine. In further downward movement of the treadle the pin 62 acts on a cam face 72 on the sleeve 52 to swing the sleeve out from over the plate 50 and thus permit the block 48 to be turned back to its former position by the spring 58. Such return of the block is permitted by upward movement of the arm 64 which occurs immediately after the starting of the machine. The mechanism for controlling this arm comprises a link 74 whereby the previously mentioned arm 66 is connected to one arm of a bell-crank lever 76, the other arm of this lever carrying a roll 78 which is engaged by a cam 80 on the shaft 10. This cam is provided with two projections 82 and 84, the projection 82 engaging the roll 78, as illustrated, when the parts are in starting positions. As the projection 82 leaves the roll 78 after the starting of the machine a spring 86 acts on the bell-crank lever 76 to raise the arm 64 as above described. Thereafter, when the projection 84 arrives in position to engage the roll 78, the arm 64 is moved downwardly and acts on the block 48 and the lever 44 to disengage the clutch member 30 from the clutch face 28 and thus stop the machine. In the construction shown the machine is thus brought to a stop automatically at an intermediate point in its cycle. Thereafter the machine is started again by depression of the treadle 56 and it is brought to a stop automatically at the end of the cycle by the action of the cam projection 82 on the roll 78.

For purposes of this invention there is further provided means whereby the operator may conveniently bring the machine to a stop at will before it is stopped automatically as above described. This means comprises a rod 88 pivotally mounted on the bell-crank lever 44 and extending downwardly through an opening in a block 90 pivotally mounted on one side of the treadle 56, nuts 92 being mounted on the rod below the block 90. Initially there is considerable space between the block and the nuts, as illustrated, to provide for lost motion in the movement of the treadle to start the machine as described. If at any time the operator should desire to stop the machine before it arrives at either of its normal stopping positions, he simply depresses the treadle farther to cause the block 90 to engage one of the nuts 92 and move the rod 88 downwardly, thereby operating the bell-crank lever 44 to disengage the clutch member 30 from the clutch face 28 and engage it with the brake surface 32. It will be evident that when the operator releases the treadle the clutch member 30 will be moved by its springs 38 again into engagement with the clutch face 28 so that the machine will resume its operation. Thereafter the machine will be brought automatically to a stop at the point predetermined by the automatic controlling means.

While the invention is herein illustrated as applied to an organization including a clutch and controlling mechanism having the particular characteristics shown and described, it is to be understood that it is not limited to an organization of that particular character.

Having described the invention, what we claim as new and desire to secure by Letters Patent of the United States is:

1. In starting and stopping mechanism, the combination with a power-driven member, of a controlling member movable by the operator to start the operation of said power-driven member, and mechanism arranged to be operated by further movement of said controlling member in the same direction as its starting movement to stop the operation of said power-driven member at the will of the operator.

2. In starting and stopping mechanism, the combination with a power-driven member operative in a predetermined cycle, of automatic means for bringing said member to a stop at a definite point with respect to its cycle, a controlling member movable by the operator to start the operation of said power-driven member, and mechanism arranged to be operated by further movement of said controlling member in the same direction as its starting movement to stop said power-driven member at the will of the operator independently of the automatic stopping means.

3. In starting and stopping mechanism, the combination with a power-driven member, of a controlling member movable by the operator to start the operation of said power-driven member, and mechanism arranged to be operated by further movement of said controlling member in the same direction as its starting movement to stop the operation of said power-driven member at the will of the operator, said mechanism being so constructed as to cause said power-driven member to resume its operation upon reverse movement of the controlling member.

4. In starting and stopping mechanism, the combination with a power-driven member, of a clutch adapted to be tripped to start the operation of said power-driven member, and a controlling member movable to trip said clutch and additionally movable to stop said power-driven member at any point in its operation at the will of the operator.

5. In starting and stopping mechanism, the combination with a power-driven member, of a clutch adapted to be tripped to start the operation of said power-driven member, a starting member movable to trip said clutch, automatic means for controlling said clutch to stop the operation of the power-driven member, and mechanism arranged to be controlled by additional movement of said starting member to render the clutch inoperative and thereby to stop the operation of said power-driven member at the will of the operator.

6. In starting and stopping mechanism, the combination with a power-driven member, of a clutch adapted to be tripped to start the operation of said power-driven member, and a starting member movable to trip said clutch and further movable in the same direction to render the clutch inoperative and thereby to stop the operation of said power-driven member.

7. In starting and stopping mechanism, the combination with a power-driven member, of a clutch adapted to be tripped to start the operation of said power-driven member, a starting member movable to trip said clutch, automatic means for controlling said clutch to stop the operation of said power-driven member, and mechanism arranged to be operated by further movement of said starting member in the same direction as its starting movement to render the clutch inoperative and thereby to stop the operation of the power-driven member independently of said automatic means.

8. In starting and stopping mechanism, the combination with a power-driven member, of a pair of cooperating clutch members for operating said power-driven member, spring means for moving one of said clutch members into engagement with the other, a starting member movable by the operator to release said spring means and render it operative, and a connection between said starting member and the movable clutch member for withdrawing the latter from engagement with the other clutch member in response to further movement of the starting member in the same direction as its starting movement.

9. In starting and stopping mechanism, the combination with a power-driven member, of a pair of cooperating clutch members for operating said power-driven member, spring means for moving one of said clutch members into engagement with the other, a starting member movable by the operator to release said spring means and render it operative, automatic means for withdrawing the movable clutch member from engagement with the other clutch member to stop the operation of the power-driven member, and mechanism arranged to be operated by further movement of said starting member in the same direction as its starting movement to withdraw the movable clutch member independently of said automatic means and thus to stop said power-driven member at the will of the operator.

10. In starting and stopping mechanism, the combination with a power-driven member, of a clutch adapted to be tripped to start the operation of said power-driven member, a bell-crank lever for controlling said clutch, a treadle movable to release said bell-crank lever and thus to trip the clutch, and a lost-motion connection between said treadle and the bell-crank lever to render the treadle effective on the clutch to stop the operation of said power-driven member at the will of the operator.

ARTHUR F. PYM.
WILLIAM E. SCARLETT.